United States Statutory Invention Registration [19]

[11] Reg. Number: H440

O'Rell

[43] Published: Mar. 1, 1988

[54] BLANKET BAR FOR NARROW GAP CYLINDERS

[75] Inventor: Dennis D. O'Rell, Boxborough, Mass.

[73] Assignee: W. R. Grace & Co., Lexington, Mass.

[21] Appl. No.: 880,223

[22] Filed: Jun. 30, 1986

[51] Int. Cl.[4] ..... B41F 1/28

[52] U.S. Cl. ..... 101/415.1

[58] Field of Search ..... 101/415.1

[56] References Cited

U.S. PATENT DOCUMENTS

| | | | |
|---|---|---|---|
| 91,573 | 6/1869 | Smith | 24/562 |
| 1,962,851 | 3/1933 | Wiseman | 24/260 |
| 1,996,583 | 4/1935 | Marchev | 101/415.1 X |
| 2,484,398 | 4/1949 | Bell et al. | 1/4 |
| 2,764,936 | 10/1956 | Johnson et al. | 101/415.1 |
| 3,675,573 | 7/1972 | Hawkes | 101/415.1 |
| 3,883,940 | 5/1975 | Wagner | 29/243.58 |
| 4,261,262 | 4/1981 | Jeschke | 101/415.1 |
| 4,560,224 | 12/1985 | Weisenburger | 339/97 C |

FOREIGN PATENT DOCUMENTS

| | | | |
|---|---|---|---|
| 2555233 | 6/1977 | Fed. Rep. of Germany | 101/415.1 |
| 2279550 | 2/1976 | France | 101/415.1 |
| 2491828 | 4/1982 | France | 101/415.1 |
| 840865 | 7/1960 | United Kingdom | 101/415.1 |

*Primary Examiner*—Harold J. Tudor

*Attorney, Agent, or Firm*—John Dana Hubbard; William L. Baker

[57] ABSTRACT

A blanket bar assembly for use on a printing blanket comprising a U-shaped bar having a centrally located channel and two arms extending outwardly from the channel in a substantially parallel relationship. Inwardly directed projections are provided on one or both arms and are directly aligned with holes on the opposite arm or arms. The projections are of such a length so as to be capable of extending through the holes and be deformed so as to lock the arms together. A printing blanket edge inserted into the channel and pierced by the projections is thereby securely fastened to the blanket bar.

14 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BLANKET BAR FOR NARROW GAP CYLINDERS

This invention relates to a blanket bar for securely attaching a printing blanket to a printing press, and more particularly, this invention relates to a blanket bar for mounting and securing blankets on presses wherein the blanket cylinder has a gap width less than 0.250 inches.

BACKGROUND

Printing blankets are generally made of one or more layers of cloth and other materials and generally have at least one surface coated with a rubber or other elastomeric material which acts as a transfer surface to take the ink image from the printing plate and transfer it to the paper on which it is to be printed.

Conventionally, these printing blankets are mounted onto the outer circumferential surface of a printing cylinder and are secured in place by various attachment means, such as reel rods or clamps. See for example, U.S. Pat. Nos. 4,261,262 and 3,675,573.

In order to ensure a secure attachment, the leading and trailing edges of the blankets are reinforced with a rigid bar, known in the industry as a blanket bar.

Blanket bars are generally made of metal, such as strip steel or extruded aluminum and are held in place by screws, bolts, rivets and/or adhesives.

One type of blanket bar has a "V" or "U" shaped channel with two extending arms which surround the edge of the blanket. For example, U.S. Pat. No. 3,675,573 shows a "V" shaped bar of extruded aluminum with each arm having an inwardly directed ridge so that when the arms are compressed into contact with the blanket edge, the ridges grip the blanket edge and hold the bar in place.

Another example is shown in U.S. Pat. No. 3,883,940 in which a series of prongs are formed in one arm of the bar. When crimped in place, the teeth bite into the blanket to fasten the bar to the blanket.

All of the bars discussed above suffer from serious drawbacks. For example, adhered bars are difficult to work with, labor intensive, cumbersome, expensive and frequently fail. When there is an adhesive failure, there is immediate separation of the blanket from its retaining device and the results are often catastrophic and can include damage to the printing press. Likewise, riveted bars and ridged bars, as discussed above, cause the blanket to pucker which increases the blanket thickness and tends to weaken the blanket in that area. Further, bars with teeth, as discussed above, are often subject to failure as these bars tend to open up, allowing the blanket to slip out of the bar and retaining means.

These problems have become even more severe in newer presses where the gap in the blanket cylinder has become narrower.

The newer presses have blanket cylinders where the gap, through which the ends of blanket are inserted and retained, has been narrowed from about 0.250 inches to less than 0.210 inches and more preferably less than 0.190 inches. Narrowing the gap reduces the incidence of cylinder "bounce" during printing. Bounce is a vibration caused by the impact of the edges of the gap against an adjacent printing roll. Bounce adversely affects (1) printing quality, causing streaks and runs and (2) machine wear, causing a rapid increase in the rate of wear of the bearings, bearers, cylinders, etc. and (3) may also reduce blanket life. The narrow gap also increases the number of printable lines on a cylinder of given size and reduces paper trim losses. Because of these benefits and the development of pinless folders among other factors, presses equipped with blanket cylinders having narrower gaps have become increasingly more popular. These newer presses are sometimes referred to as narrow gap presses.

Narrow gap presses require thinner blankets and thinner bars. Extruded aluminum bars cannot be made thin enough to be used on a narrow gap press and still provide the required rigidity and retention strength. Likewise, riveted bars, because they pucker the blanket and increase the blanket thickness, are not acceptable. The "U" shaped bar as disclosed in U.S. Pat. No. 3,883,940 is impractical in a thin design because there is not sufficient strength in the bar to prevent it from opening up and allowing the blanket to slip out of the bar and retaining means. The problems with adhered bars become magnified in narrow gap presses.

The present invention while preferably used on narrow gap presses, can be used on other presses as well, and provides a simple, efficient means for ensuring the retention of the bar to the blanket.

SUMMARY

It is an object of the present invention to provide an inexpensive, thin, rigid blanket bar for use on printing blankets, especially on printing blankets used on newer presses equipped with blanket cylinders which have a narrow gap, i.e. less than 0.210 inches.

It is a further object of this invention to provide a blanket bar comprising an elongated strip of metallic material having a U-shaped channel and a first and second arm extending outwardly from the channel in parallel relationship to each other, at least the first arm having one or more projections extending outwardly from the first arm toward the second arm, at least the second arm having one or more holes through which the projections are capable of extending and being clenched over to lock the first and second arms together.

Another object is to provide a blanket bar having a series of locking projections having a triangular, rectangular or circular shape.

It is an object of the present invention to provide a printing blanket and blanket bar assembly for use in a printing press comprising a printing blanket having a leading and trailing edge, blanket bars secured to the leading and trailing edges, wherein each blanket bar has a channel and a first and second arm extending outwardly from the channel, the first and second arm being in a parallel relationship to each other, the printing blanket being between the first and second arms and abutting an inner surface of the channel, the first and second arms having a series of projections and holes, the projections of the first arm being in alignment with the holes of the second arm and the projections of the second arm being in alignment with the holes of the first arm, the projections of the first and second arms extending through the printing blanket and the holes in the other arm and being bent over onto the outer surface of the first and second arms so as to secure each blanket bar to the edges of the printing blanket.

It is another object to provide a blanket bar and printing blanket assembly wherein the thickness of the assembly is no greater than the sum of the blanket thickness plus the thickness of each arm of the bar and more preferably, the total thickness of the assembly is at least 0.002 inches less than the sum of the blanket thickness plus the thickness of each arm of the bar.

The present invention provides a simple and economical blanket bar being "U" shaped and having a channel and two radial arms extending outwardly from the channel. Inwardly directed projections on one or both arms are provided and holes are provided on one or both arms directly opposite and in alignment with the projections on the opposite arm, the projections are of a length sufficient to extend through the corresponding holes on the other arm and to be deformed over so as to lock the two arms together. A printing blanket inserted into the channel and pierced by the projections can therefore be securely fastened to the bar.

These and other objects of the present invention will be readily apparent from the embodiments thereof presented in the following specification, claims and drawings.

BRIEF DESCRIPTION OF THE DRAWINGS

The accompanying drawings show preferred embodiments of the present invention, in which.

DETAILED DESCRIPTION

Figure 1:
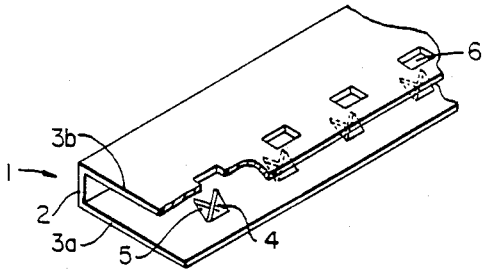
FIG. 1 is a cross-sectional view of the blanket bar.

In FIG. 1 is a preferred embodiment of the present invention.

The blanket bar 1 is generally formed in a U or V shape, having a channel portion 2 and two outwardly extending arms 3*a* and 3*b* which are substantially parallel to each other. On arm 3*a* is a projection 4. An opening 5 is optionally formed when the projection 4 is made in the arm 3*a*. The opening can occur when the projection is punched, stamped or otherwise formed out of the substantial flat surface of the arm 3*a*.

On arm 3*b* is a hole 6 substantially in alignment with the projection 4 of arm 3*a*. The hole 6 may be formed in any well known manner such as punching, stamping, drilling or casting.

Figure 2:
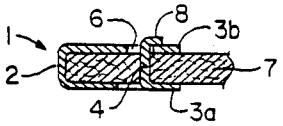
FIG. 2 is a cross-sectional view of the blanket bar and printing blanket as assembled for use.

FIG. 2 shows the blanket bar attached to a printing blanket edge 7. The blanket edge 7 is inserted between the arms 3*a* and *b* and butted up against the inner surface of the channel 2. The arms 3*a* and 3*b* have been moved toward each other so as to engage the surface of the blanket. The projection 4 has pierced through the blanket and extends through the corresponding hole 6 to a point beyond the outer surface of arm 3*b*. The outermost tip 8 of the projection 4 has been deformed so as to lock the two arms together and thereby securely fasten the blanket bar to the blanket edge.

It is understood that the blanket bar is preferably of a length corresponding to the length of the blanket edge. The width of the arms 3*a* and *b* is not critical to the invention. The width should be sufficiently wide to ensure that the blanket bar is properly attached to the blanket edge and that the resultant assembly is sufficiently rigid so as to resist deformation when the typical tensions are applied during use in the press. Likewise, the width should not be so long as to interfere with the attachment mechanism, such as a reel rod or as to make the assembly unduly expensive or cumbersome. Furthermore, there is no requirement that arms 3*a* and 3*b* be the same width, so long as the corresponding projections and holes are in alignment.

Figure 5:
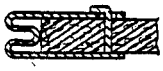
Figure 6:
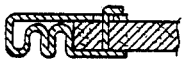

The channel, 2, is preferably centralized although it may not be in a central location when the arms are of different widths. In all cases, the channel should be formed sufficiently toward the center of the bar so as to ensure adequate length to the arms and retention of the bar to the blanket. The channel may be of a simple design as shown in FIG. 1 or may be more complex as depicted in FIGS. 5 and 6. The exact shape may be further optimized to achieve maximum stiffness and minimize any distortion which might occur while the blanket is mounted on the press.

Figure 4:
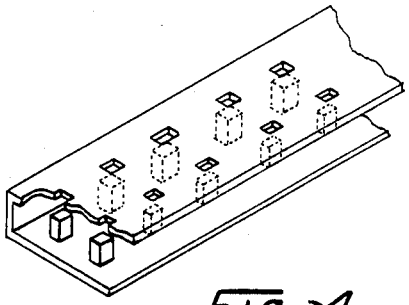
Figure 7:
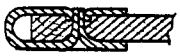

The projections are preferably triangular in shape, though they can be rectangular as shown in FIG. 4 or circular as shown in FIG. 7 or any other shape which is capable of extending through a hole on the opposite arm and is capable of being deformed to lock the bar in place.

The holes may also be of similar shapes to those of the projections, though preferably the holes are rectangular in shape.

Figure 3:
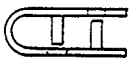
FIGS. 3–7 are cross-sectional views of other preferred embodiments of the projections.

The projections and holes may be on one or both arms, as shown by FIG. 3. They may be formed in rows as in FIG. 4 or alternating rows and may be spaced at regular or irregular intervals. The arrangement is not critical so long as the projections align with holes on the opposite arm and securely fasten the bar to the blanket.

The projections and holes may be made in any manner conventional to metalworking. Examples of such include but are not limited to stamping, punching, drilling and casting. Preferably, the projections and holes are formed simultaneously by a die punch on a flat sheet of metal, such as strip steel which is then bent to form the channel and arms. The projections and holes can be formed when the metal is cast and then formed into the required shape, though such a process would be more expensive and time consuming.

In addition to the projections and holes, other embossments, such as ridges, points, teeth, etc. may be added to one or both arms to enhance adhesion of the bar to the blanket. These embossments do not have to penetrate the entire blanket thickness and preferably do not.

It may also be desirable to use an adhesive in addition to the projections and holes. Suitable adhesives for the present invention include self-curing two component epoxies, heat set phenolic nitrile adhesives and hot melt adhesives, all commonly used in the printing industry and commercially available.

Materials useful in the present invention for the blanket bars include but are not limited to the various grades of stainless steel, strip steels which preferably have a corrosion resistant coating such as paint, lacquer and other rust proof finishes, and various sheet metals. The material selected should be sufficiently strong to resist kinking and excess bending, but should be sufficiently ductile to allow for the formation of the channel, arms, projections, holes and other retention aids formed on or in the material. Preferably, stainless steel is used because of its strength, ductibility and corrosion resistance. The material selected has a thickness of from about 0.005 to about 0.020 inches, preferably from about 0.010 to about 0.020 inches.

It is desirable that the thickness of the blanket and bar assembly be as thin as possible. While the assembly may be thicker than the sum of the thicknesses of the blanket and metal in each arm of the bar, it is a preferred embodiment of this invention that the thickness of the blanket and bar assembly be no greater than the sum of the blanket thickness plus the thickness of the metal in each arm of the bar. In the most preferred embodiment, the final thickness of the blanket and bar assembly is at least 0.002 inches less than the sum of the blanket thickness plus the thickness of the metal in each arm of the bar.

A preferred example of the present invention as shown in FIGS. 1 and 2 is formed from a flat piece of stainless steel, having a total width of 1.5 inches and a thickness of 0.015 inches. Approximately 0.25 inches in from the longitudinal edge of the piece, a series of rectangular holes, 0.125 of an inches wide and 0.186 inches long, are formed by punching with a die punch. The holes are spaced 0.5 inches apart, measured from center to center. A corresponding series of triangular projections are formed by a die punch, approximately 0.25 inches in from the other longitudinal edge. The base of the projection is closest to the longitudinal edge and measured 0.25 inches in width. The height of the projection was 0.186 inches and the projections were spaced 0.5 inches apart, as measured from center to center of the base. The projections and holes were in parallel alignment. The strip was then bent at its middle to form a channel and two arms each approximately 0.75 inches long. The projections of one arm faced inwardly toward the other arm and the projections and holes were aligned with each other. A thin blanket, POLYWEB® by W. R. Grace & Co., having a thickness of 0.067 inches was inserted into the channel and butted up against the inner end of the channel. The arm having the projections was moved toward the other arm in a clamping device, such as a break press (hydraulic or air activated) until the projections had pierced through the blanket and holes and extended about 0.109 inches beyond the outer surface of the arm containing the holes. The projections were then deformed by bending or clenching over in a direction away from the channel so as to lie substantially flat against the outer surface of the arm containing the holes. It was found that the projections in being clenched over slightly deformed the edge of the holes through which they extended so that the projections were substantially flush with the outer surface of the arm. The thickness of the blanket and bar assembly was approximately 0.095 inches as measured from outside to outside surface. The assembly thickness was about 0.002 inches less than the sum (0.097) of the blanket thickness (0.067) and the thickness of the metal in each arm ($0.015 \times 2 = 0.030$), resulting in a blanket and bar assembly which is thinner than other assemblies and as strong, if not stronger than other assemblies.

The projections which penetrate the other arm are clinched to prevent the arms from opening or spreading apart, thereby maintaining its crimped dimension. Failure to maintain the initial crimped thickness would make blanket removal from the cylinder more difficult.

Thin metals, i.e. those less than 0.015 inches, do not have sufficient strength to maintain proper caliper at the extreme edge of the arms, even if they are adhesively bonded to the blanket. Through the use of the present invention namely, the introduction of appropriate projections in at least one arm and corresponding recesses in the other and the engagement and clenching of those projections, a mechanical means is provided for maintaining the preferred thickness of the barred blanket at the extreme edges of the arms of the bar, even with thin metals.

The present invention represents an important improvement in the printing industry, eliminating one of the problems which has prevented the large scale acceptance and use of narrow gap cylinders and their associated blankets and bars.

While this invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

What I claim is:

1. A blanket bar comprising an elongated strip of metal having a channel, first arm and second arm radiating outwardly from the channel in parallel relationship to each other, the first arm and second arm having a series of projections perpendicular to the plane of the first and second arms, the first and second arms having a series of holes in alignment with the series of projections on the other arm, the projections being of such length as to extend through the holes on the other arm and capable of being clenched over so as to lock the first and second arms together.

2. A blanket bar of claim 1 wherein the metal is selected from the group consisting of stainless steel and corrosion resistant strip steel.

3. A blanket bar of claim 1 wherein the thickness of the metal is from about 0.005 to about 0.020 inches.

4. A printing blanket and blanket bar assembly comprising a printing blanket having a leading edge and a trailing edge, a first and second blanket bar fastened to the leading and the trailing edge, the first and second blanket bars being U-shaped and having a first and second arm projecting outwardly in a substantially parallel relationship to each other from a center of the bar, the first and second arms having a series of projections and holes arranged so that the projections of one arm are in alignment with the holes of another arm; the projections of the first and second arms extending through the blanket and the corresponding holes in the other arm and being deformed over so as to lock the blanket bars to the edges of the blanket.

5. The assembly of claim 4 wherein the projections are deformed by being clenched over.

6. The assembly of claim 4 wherein the bar is selected from the group consisting of stainless steel and corrosion resistant strip steel.

7. The assembly of claim 4 wherein the thickness of the blanket and bar assembly is equal to or less than a sum of a blanket thickness plus thickness of the arms of the bar.

8. The assembly of claim 7 wherein the thickness of blanket and bar assembly is at least 0.002 inches less than the sum of the blanket thickness plus the thickness of the arms of the bar.

9. The assembly of claim 4 wherein the projections are triangular in shape and the holes are rectangular in shape.

10. The assembly of claim 4 wherein the projections are tubular in shape and the holes are circular in shape.

11. The assembly of claim 4 wherein the projections and holes are rectangular in shape.

12. The assembly of claim 6 wherein the bar has a thickness of from about 0.005 to about 0.020 inches.

13. A printing blanket and blanket bar assembly comprising a printing blanket having a leading edge and a trailing edge, a first blanket bar fastened to the leading edge of the blanket and a second blanket bar fastened to the trailing edge of the blanket, the first and second blanket bars being formed of a metallic material having a thickness of from about 0.005 to about 0.020 inches, the metallic material being U-shaped and having a first and second arm projecting outwardly in a substantially parallel relationship to each other, the first and second arms having a series of projections and holes arranged so that the projections of one arm are in alignment within the holes of another arm; the projections of the first and second arms extending through the blanket and corresponding holes in the other arm and being deformed so as to lock the first and second blanket bars to the leading and trailing edges of the blanket; and the printing blanket and blanket bar assembly have a thickness equal to or less than a sum of the blanket thickness plus a sum of thickness of the arms of the bar.

14. The assembly of claim 13 wherein the thickness of the blanket and bar assembly is at least 0.002 inches less than the sum of the blanket thickness plus the thickness of the arms of the blanket bar.

* * * * *